United States Patent
Chuang et al.

(10) Patent No.: US 10,405,400 B2
(45) Date of Patent: Sep. 3, 2019

(54) POWER SUPPLY SYSTEM AND VOLTAGE OUTPUT MODULE

(71) Applicant: FSP TECHNOLOGY INC., Taoyuan (TW)

(72) Inventors: Tung-Jung Chuang, Taoyuan (TW); Shung-Hung Wu, Taoyuan (TW)

(73) Assignee: FSP TECHNOLOGY INC., Taoyuan (TW)

( * ) Notice: Subject to any disclaimer, the term of this patent is extended or adjusted under 35 U.S.C. 154(b) by 0 days.

(21) Appl. No.: 15/867,711

(22) Filed: Jan. 11, 2018

(65) Prior Publication Data

US 2018/0213618 A1   Jul. 26, 2018

Related U.S. Application Data

(60) Provisional application No. 62/448,401, filed on Jan. 20, 2017.

(51) Int. Cl.
| | |
|---|---|
| *H05B 33/08* | (2006.01) |
| *H02J 9/00* | (2006.01) |
| *G06F 1/26* | (2006.01) |
| *H02M 3/00* | (2006.01) |

(52) U.S. Cl.
CPC ............ *H05B 33/089* (2013.01); *G06F 1/26* (2013.01); *H02J 9/00* (2013.01); *H02M 3/00* (2013.01); *H05B 33/0815* (2013.01); *Y02B 20/341* (2013.01)

(58) Field of Classification Search
CPC .. H05B 33/08; H05B 33/0815; H05B 33/089; H05B 37/02; H02J 9/00; H02J 9/02; G06F 1/26; G06F 3/00; H02M 3/00; H02M 3/05
See application file for complete search history.

(56) References Cited

U.S. PATENT DOCUMENTS

| | | | |
|---|---|---|---|
| 9,710,036 B2 * | 7/2017 | Lu | G06F 1/263 |
| 2013/0043727 A1 * | 2/2013 | Liu | G06F 1/26 307/31 |
| 2014/0019777 A1 * | 1/2014 | Shih | G06F 1/26 713/300 |

* cited by examiner

*Primary Examiner* — Thai Pham
(74) *Attorney, Agent, or Firm* — Winston Hsu (57) ABSTRACT

A power supply system includes at least a first power supply and a second power supply and a voltage output circuit. The first power supply provides a first set of signals while the second power supply provides a second set of signals. The voltage output circuit includes a first input terminal, a second input terminal, a first output terminal, a switch circuit and a control circuit. The first input terminal receives a first voltage signal of the first set of signals while the second input terminal receives a second voltage signal of the second set of signals, the switching circuit couples between the first and the second input terminal and the first output terminal, and the control circuit activates a first or second transistor according to a voltage difference between the first and second input terminal to generate a first output voltage signal on the first output terminal.

13 Claims, 6 Drawing Sheets

POWER SUPPLY SYSTEM AND VOLTAGE OUTPUT MODULE

CROSS REFERENCE TO RELATED APPLICATIONS

This application claims the benefit of U.S. Provisional Application No. 62/448,401, which was filed on Jan. 20, 2017, the contents of which are incorporated herein by reference.

BACKGROUND OF THE INVENTION

1. Field of the Invention

The present invention relates to a power circuit, and more particularly, to a power supply system with a plurality of power supplies and a voltage output module.

2. Description of the Prior Art

Conventional electronic devices such as desktops and laptops typically comprise only one power supply. When a glitch occurs in the power supply or the power supply is corrupted, the devices might not be able to operate normally. Even worse, the data stored therein may be corrupted and cannot be restored, which may cost considerable effort to be fixed. To keep this scenario from happening, a system/circuit cooperating with a plurality of power supplies is required.

SUMMARY OF THE INVENTION

One of the objectives of the present invention is to provide a power supply system and a voltage output module to solve the aforementioned problem.

According to an embodiment of the present invention, a power supply system is disclosed, comprising: a plurality of power supplies and a voltage output circuit. The plurality of power supplies comprise at least a first power supply and a second power supply, wherein the first power supply is arranged to provide a first set of signals, and the second power supply is arranged to provide a second set of signals; the voltage output circuit is coupled to the plurality of power supplies, and comprises a first input terminal, a second input terminal and a first output terminal, wherein the first input terminal receives a first voltage signal of the first set of signals and the second input terminal receives a second voltage signal of the second set of signals. In addition, the voltage output circuit comprises: a switching circuit and a control circuit, wherein the switching circuit is coupled to the first input terminal, the second input terminal and the first output terminal, and the control circuit is arranged to determine whether to activate a first transistor or a second transistor in the switching circuit according to a voltage difference between the first input terminal and the second input terminal in order to make the voltage output circuit generate a first output voltage on the first output terminal according to the first voltage signal or the second voltage signal.

According to an embodiment of the present invention, a voltage output module is disclosed, comprising: a circuit board, a plurality of input cables and an output cable installed on the circuit board, and a voltage output circuit. The voltage output circuit comprises a first input terminal, a second input terminal and a first output terminal, and the first input terminal is coupled to the input cable to receive a first voltage signal of a first set of signals provided by a first power supply, the second input terminal is coupled to another input cable to receive a second voltage signal of a second set of signals provided by a second power supply, wherein the voltage output circuit determines whether to select the first voltage signal or the second voltage signal in order to generate the first output voltage signal according to a voltage difference between the first input terminal and the second input terminal.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should not be interpreted as a close-ended term such as "consist of". Also, the term "couple" is intended to mean either an indirect or direct electrical connection. Accordingly, if one device is coupled to another device, that connection may be through a direct electrical connection, or through an indirect electrical connection via other devices and connections.

Figure 1:
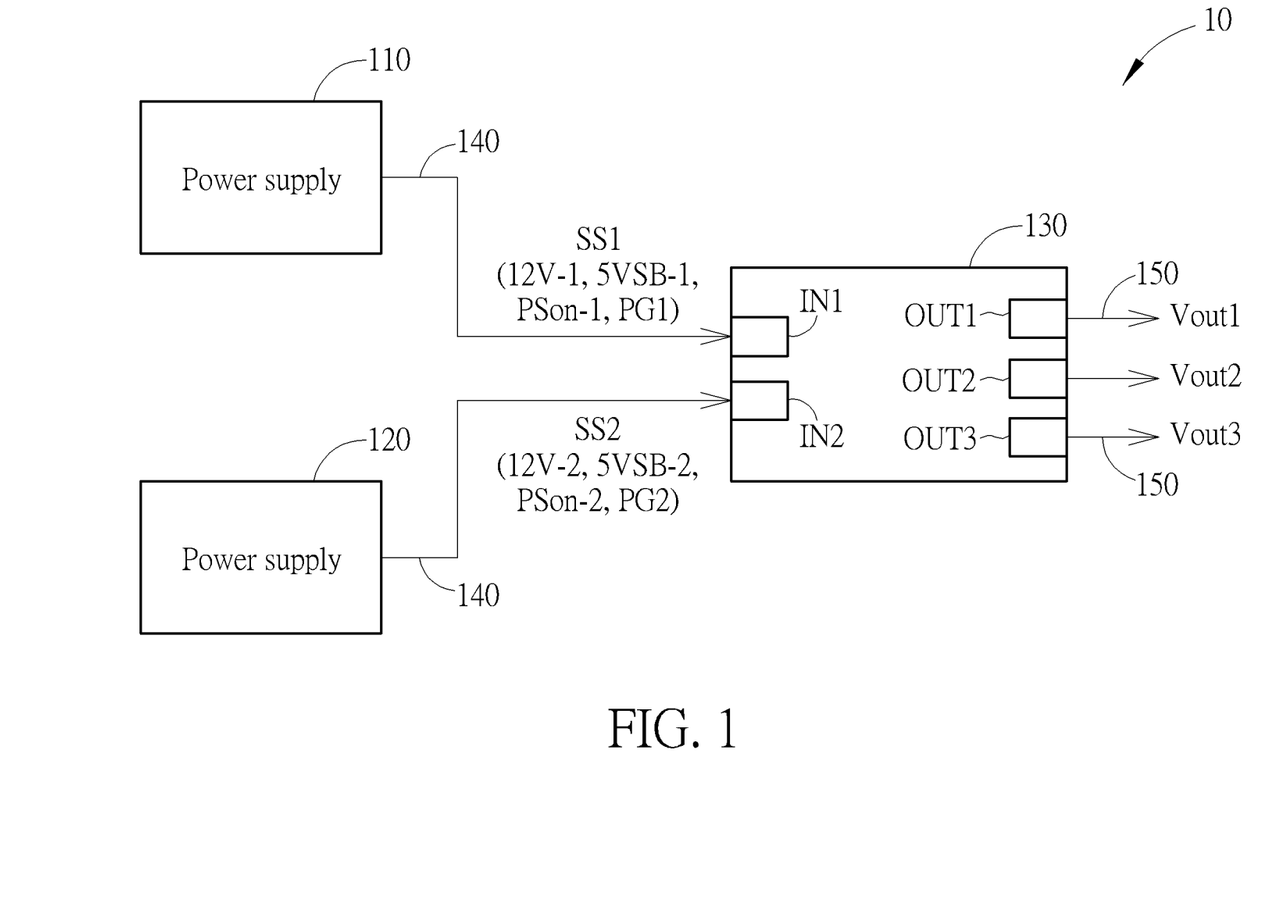
FIG. 1 is a diagram illustrating a power supply system according to an embodiment of the present invention.

FIG. 1 is a diagram illustrating a power supply system 10 according to an embodiment of the present invention. As shown in FIG. 1, the power supply system 10 comprises a first power supply 110, a second power supply 120, and a voltage output circuit 130. The power supply 110 outputs a set of signals SS1 comprising a 12 volts voltage signal 12V-1, a 5 volts standby voltage signal 5VSB-1, a Power Supply-on (PS-on) signal PSon-1 and a Power Good (PG) signal PG1, and the power supply 120 outputs a set of signals SS2 comprising a 12 volts voltage signal 12V-2, a 5 volts standby voltage signal 5VSB-2, a PS-on signal PSon-2 and a PG signal PG2. The voltage output circuit 130 comprises input terminals IN1 and IN2 and output terminals OUT1-OUT3, wherein the input terminal IN1 is coupled to the power supply 110, and arranged to receive the set of signals SS1 from the power supply 110, and the input terminal IN2 is coupled to the power supply 120, and arranged to receive the set of signals SS2 from the power supply 120. In addition, the voltage output circuit 130 generates the output voltages Vout1, Vout2, and Vout3 on the output terminals OUT1, OUT2 and OUT3, respectively. It should be noted that, in the embodiment shown in FIG. 1, the power supply system 10 comprises two power supplies. This is not a limitation of the present invention, however. The power supply system 10 may comprise more than two power supplies. Correspondingly, the voltage output circuit 130 comprises more than two input terminals to receive signals from the power supplies. In this embodiment, the 12 volts voltage signals 12V-1 and 12V-2, and the 5 volts standby voltage signals 5VSB-1 and 5VSB-2, the PS-on signals PS-on1 and PS-on2, and the PG signals PG1 and PG2 are typical signals provided by the conventional power supply. Those skilled in the art should readily understand the meaning and the function of each signal. The detailed description is omitted here for brevity. In this embodiment, the output voltages Vout1-Vout3 have different voltage values. For example, the output voltages Vout1-Vout3 are 12 volts, 5 volts and 3.3 volts, respectively, and the output voltages Vout1-Vout3 couple to the backend circuits.

The generation of the output voltages Vout1-Vout3 will be described in the following paragraphs.

In one embodiment, the power supply system 10 may be implemented on a circuit board. The power supplies 110 and 120 can be coupled to the voltage output circuit 130 via input cables 140, and the output terminals OUT1-OUT3 of the voltage output circuit 130 can be coupled to a motherboard of a computer via output cables 150 to output voltages for implementing a voltage output module. In addition, the power supplies 110 and 120 shown in FIG. 1 are not limited to be implemented on the same circuit board. Furthermore, the power supplies 110 and 120 shown in FIG. 1 are not limited to be the same model or to be manufactured by the same factory. The present invention can be applied as long as each of the sets of signals SS1 and SS2 respectively generated by the power supplies 110 and 120 has a 12 volts voltage signal, a 5 volts standby voltage signal, a PS-on signal and a PG signal. In other words, with the architecture proposed by the present invention, the power supplies 110 and 120 can be replaced by other supplies of different types without further limitation.

Figure 2:
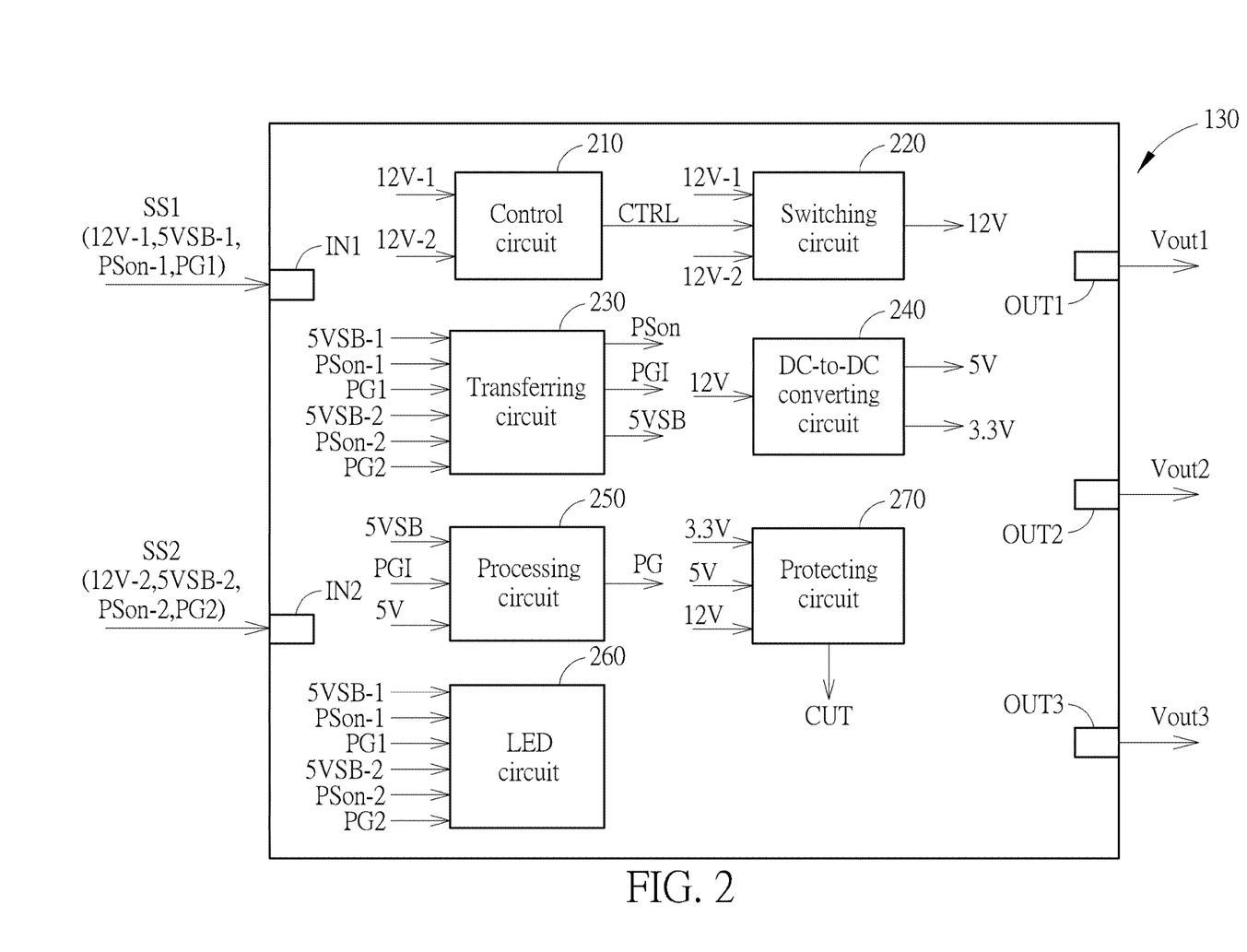
FIG. 2 is a diagram illustrating a voltage output circuit according to an embodiment of the present invention.

FIG. 2 is a diagram illustrating the voltage output circuit 130 according to an embodiment of the present invention. As shown in FIG. 2, the voltage output circuit 130 comprises a control circuit 210, a switching circuit 220, a transferring circuit 230, a DC-to-DC converting circuit 240, a processing circuit 250, a Light-Emitting diode (LED) circuit 260, and a protecting circuit 270. The control circuit 210 receives 12 volts voltage signals 12V-1 and 12V-2 from the input terminals IN1 and IN2, and generates a set of control signals CTRL to the switching circuit 220 according to a voltage difference between the 12 volts voltage signals 12V-1 and 12V-2; the switching circuit 220 generates a 12 volts voltage signal 12V according to the 12 volts voltage signals 12V-1 and 12V-2 and the set of control signals CTRL, wherein (as mentioned in the embodiment of FIG. 1) the 12 volts voltage signal 12V can be coupled to the output terminal OUT1 and outputted as the output voltage Vout1 for the backend circuits; the transferring circuit 230 receives the 5 volts standby voltage signals 5VSB-1 and 5VSB-2, the PS-on signals PSon-1 and PS-on2, and the PG signals PG1 and PG2 from the input terminals IN1 and IN2, and generates an output 5 volts standby voltage signal 5VSB, an output PS-on signal PSon, and a PG input signal PGI; the DC-to-DC converting circuit 240 receives the 12 volts voltage signal 12V from the switching circuit 220, and executes a DC-to-Dc converting operation upon the 12 volts voltage signal 12V to generate a 5 volts voltage signal 5V and a 3.3 volts voltage signal 3.3V, wherein (as mentioned in the embodiment of FIG. 1) the 5 volts voltage signal 5V and the 3.3 volts voltage signal 3.3V can be respectively coupled to the output terminals OUT2 and OUT3 and outputted as the output voltages Vout2 and Vout3 for the backend circuits. The processing circuit 250 receives the output 5 volts standby voltage signal 5VSB and the PG input signal PGI from the switching circuit 220, and generates an inform signal PG, wherein the inform signal PG indicates if the PG input signal PGI is normal. The LED circuit 260 receives the 5 volts standby voltage signals 5VSB-1 and 5VSB-2, the PS-on signals PSon-1 and PS-on2, and the PG signals PG1 and PG2 from the input terminals IN1 and IN2. When one of the PG signals PG1 and PG2 indicates that the corresponding power supply operates abnormally, an LED of the LED circuit 260 is driven to inform the user. The protecting circuit 270 receives the 12 volts voltage signal 12V, the 5 volts voltage signal 5V, and the 3.3 volts voltage signal 3.3V from the switching circuit 220 and the DC-to-DC converting circuit 240, and when one of the 12 volts voltage signal 12V, the 5 volts voltage signal 5V, and the 3.3 volts voltage signal 3.3V is not located in a normal operating range, a cut off signal CUT is generated to cut off the power supply supplying the voltage. In this embodiment, the DC-to-DC converting circuit 240 and the protecting circuit 270 are well-known to those skilled in the art; a detailed description of the DC-to-DC converting circuit 240 and the protecting circuit 270 is therefore omitted here.

Figure 3:
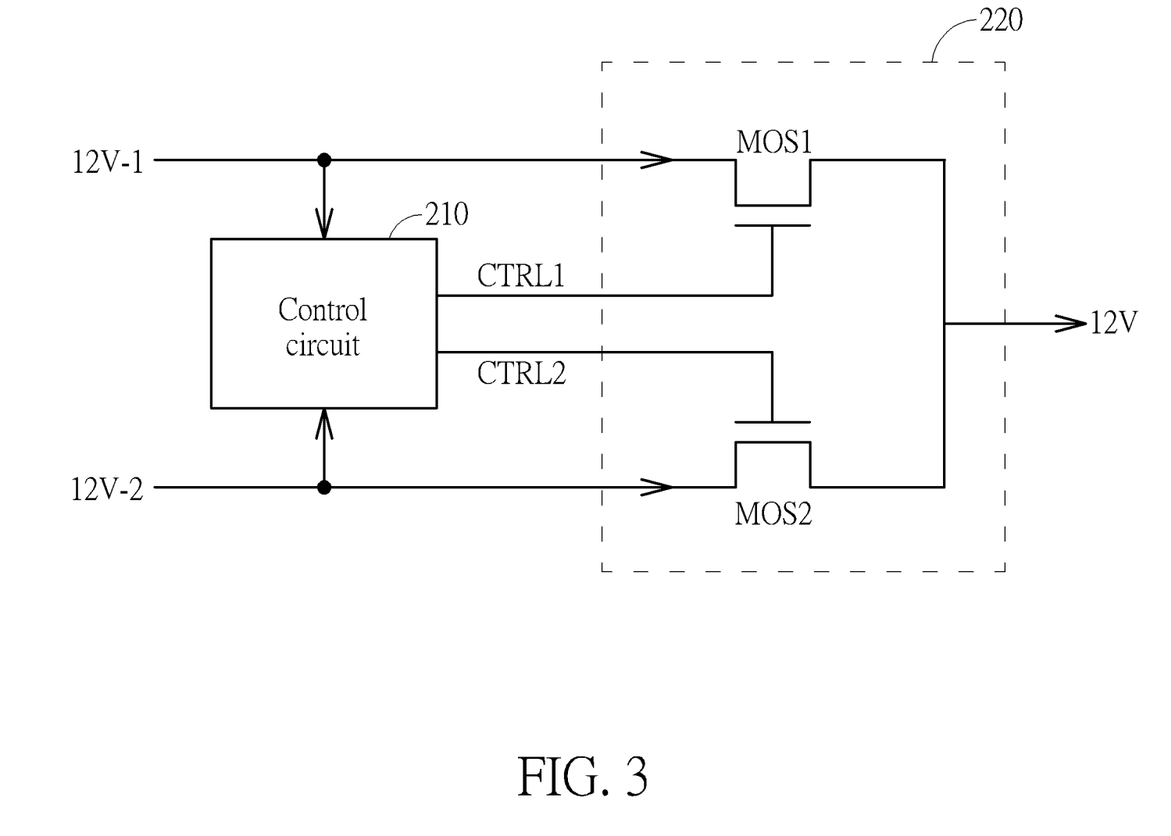
FIG. 3 is a diagram illustrating a control circuit and a switching circuit of the voltage output circuit shown in FIG. 2.

FIG. 3 is a diagram illustrating the control circuit 210 and the switching circuit 220 of the voltage output circuit 130 shown in FIG. 2. As shown in FIG. 3, the control circuit 210 is arranged to receive the 12 volts voltage signals 12V-1 and 12V-2, and generates the set of control signals CTRL to the switching circuit 220 according to the voltage difference between the 12 volts voltage signals 12V-1 and 12V-2, wherein the set of control signals CTRL comprises control signals CTRL1 and CTRL2. The switching circuit 220 comprises transistors MOS1 and MOS2, wherein a drain terminal of the transistor MOS1 receives the 12 volts voltage signal 12V-1, a gate terminal of the transistor MOS1 receives the control signal CTRL1, and a source terminal of the transistor MOS1 can be coupled to the output terminal OUT1. Likewise, a drain terminal of the transistor MOS2 receives the 12 volts voltage signal 12V-2, a gate terminal of the transistor MOS2 receives the control signal CTRL2, and a source terminal of the transistor MOS2 can be coupled to the output terminal OUT1. More specifically, assuming the power supply 110 of the power supply system 10 is the default power supply, when the power supply 110 operates normally, the control circuit 210 generates the control signals CTRL1 and CTRL2 to activate (turn on) the transistor MOS1 and deactivate (turn off) the transistor MOS2. In this way, the 12 volts voltage signal 12V-1 is outputted to the output terminal OUT1 as the 12 volts voltage signal 12V. When the power supply 110 malfunctions and is therefore not able to normally provide the 12 volts voltage signal 12V-1, the control circuit 210 generates the control signals CTRL1 and CTRL2 to deactivate (turn off) the transistor MOS1 and activate (turn on) the transistor MOS2 by detecting the voltage difference between the 12 volts voltage signals 12V-1 and 12V-2. In this way, the 12 volts voltage signal 12V-2 is outputted to the output terminal OUT1 as the 12 volts voltage signal 12V. Therefore, when the power supply of the power supply system malfunctions, the other power supply can provide the voltage in real-time to prevent the stored data from being corrupted. It should be noted that, in the embodiment shown in FIG. 2, circuits relatively irrelevant to the present invention are not depicted: for example, resistors and impedances; however, those skilled in the art should readily understand the functions and the connections of those circuits. The detailed description is omitted here for brevity. Compared to the prior art using diodes to implement the transistors MOS1 and MOS2 in the switching circuit 220, the voltage output circuit 130 proposed by the present invention can effectively avoid current flowing back.

Figure 4:
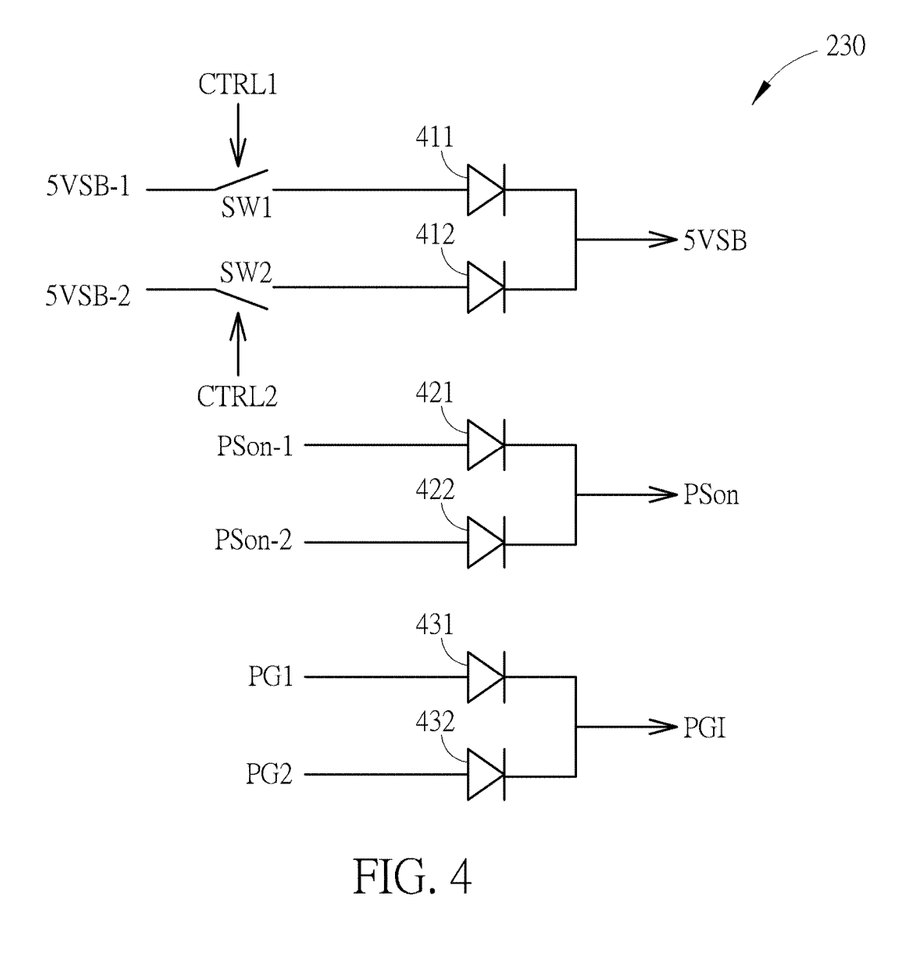
FIG. 4 is a diagram illustrating a transferring circuit of the voltage output circuit shown in FIG. 2.

FIG. 4 is a diagram illustrating the transferring circuit 230 of the voltage output circuit 130 shown in FIG. 2. As shown in FIG. 4, the transferring circuit 230 comprises diodes 411, 412, 421, 422, 431 and 432, wherein the diodes 411 and 412 are arranged to receive the 5 volts standby voltage signals 5VSB-1 and 5VSB-2 respectively, the diodes 421 and 422 are arranged to receive the PS-on signals PSon-1 and PSon-2 respectively, and the diodes 431 and 432 are arranged to receive the PG signals PG1 and PG2 respectively. When the switching circuit 220 outputs the 12 volts voltage signal 12V-1 as the 12 volts voltage signal 12V, the transferring circuit 230 outputs the 5 volts standby voltage signal 5VSB-1 as the output 5 volts standby voltage signal 5VSB, the PS-on signal PSon-1 as the output PS-on signal PSon, and the PG signal PG1 as the PG input signal PGI. Likewise, when the switching circuit 220 outputs the 12 volts voltage signal 12V-2 as the 12 volts voltage signal 12V, the transferring circuit 230 outputs the 5 volts standby voltage signal 5VSB-2 as the output 5 volts standby voltage signal 5VSB, the PS-on signal PSon-2 as the output PS-on signal PSon, and the PG signal PG2 as the PG input signal PGI. It should be noted that the transferring circuit 230 may further comprise a plurality of switches; for example, the switches SW1 and SW2 coupling to the 5 volts standby voltage signals 5VSB-1 and 5VSB-2, respectively, as shown in FIG. 4. The switches Sw1 and SW2 are controlled by the control signals CTRL1 and CTRL2, respectively, which are generated by the control circuit 210. More specifically, when the power supply 110 operates normally, the control signal CTRL1 controls the transistor MOS1 of the switching circuit 220 to output the 12 volts voltage signal 12V-1, and also controls the switch SW1 to output the 5 volts standby voltage signal 5VSB-1 as the output 5 volts standby voltage signal 5VSB. Correspondingly, when the power supply 110 operates abnormally, the control signal CTRL2 controls the transistor MOS2 of the switching circuit 220 to output the 12 volts voltage signal 12V-2, and also controls the switch SW2 to output the 5 volts standby voltage signal 5VSB-2 as the output 5 volts standby voltage signal 5VSB. Likewise, when the power supply 110 operate normally, the control signal CTRL1 controls the transistor MOS1 of the switching circuit 220 to output the 12 volts voltage signal 12V-1, and the transferring circuit 230 outputs the PS-on signal PSon-1 as the output PS-on signal PSon, and the PG signal PG1 as the PG input signal PGI. Correspondingly, when the power supply 110 operates abnormally, the control signal CTRL2 controls the transistor MOS2 of the switching circuit 220 to output the 12 volts voltage signal 12V-2, and the transferring circuit 230 outputs the PS-on signal PSon-2 as the output PS-on signal PSon, and the PG signal PG2 as the PG input signal PGI. It should be noted that the connections of the switches SW1 and SW2 are only for illustrative purposes, and are not a limitation of the present invention. The outputs of the PS-on signals PSon-1 and PSon-2 and the PG signals PG1 and PG2 can also be controlled by switches not shown in FIG. 4. Those skilled in the art should readily understand the implementation after reading the paragraphs above; the detailed description is therefore omitted here. It should be noted that, in the embodiment shown in FIG. 4, the circuits relatively irrelevant to the present invention are not depicted; for example, resistors and impedances; however, those skilled in the art should readily understand the functions and the connections of those circuits. The detailed description is omitted here for brevity.

Figure 5:
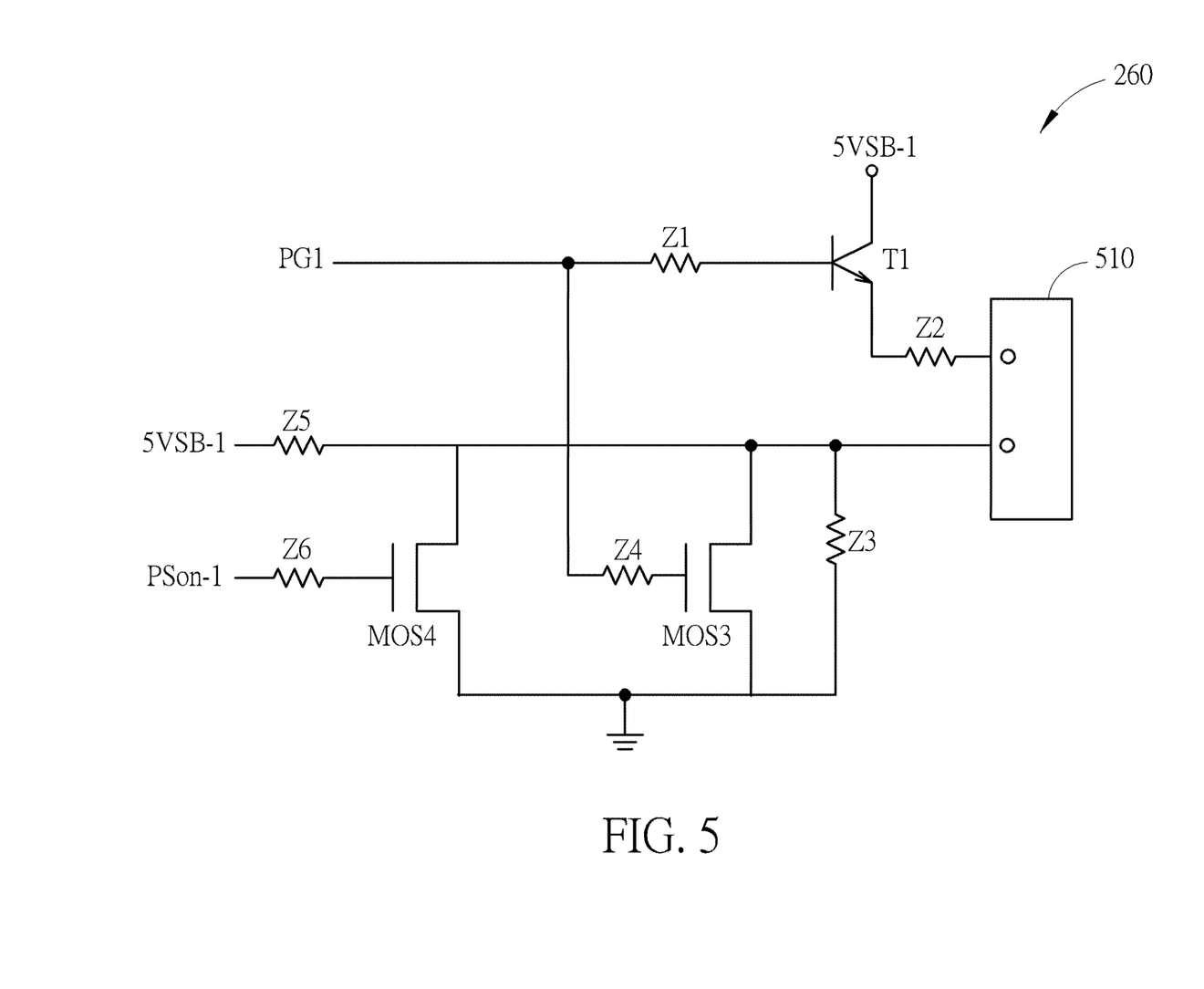
FIG. 5 is a diagram illustrating an LED circuit of the voltage output circuit shown in FIG. 2.

FIG. 5 is a diagram illustrating the LED circuit 260 of the voltage output circuit 130 shown in FIG. 2. The LED circuit 260 shown in FIG. 5 only comprises the relevant circuits for processing the signals generated by the power supply 110, i.e. the 5 volts standby voltage signal 5VSB-1, the PG signal PG1, and the PS-on signal PSon-1. Those skilled in the art should readily understand the LED circuit 260 can comprise identical circuits for processing the signals generated by the power supply 120, i.e. the 5 volts standby voltage signal 5VSB-2, the PG signal PG2, and the PS-on signal PSon-2. The LED circuit 260 comprises transistors T1, MOS3 and MOS4, and impedances Z1-Z6. In this embodiment, the transistor T1 can be implemented by, but is not limited to, a bipolar junction transistor (BJT), and each of the transistors MOS3 and MOS4 can be implemented by, but are not limited to, a metal-oxide semiconductor (MOS). As shown in FIG. 5, a collector terminal of the transistor T1 receives the 5 volts standby voltage signal 5VSB1, a base terminal of the transistor T1 receives the PG signal PG1, and an emitter terminal of the transistor T1 is coupled to an LED 510 via an impedance Z2; a drain terminal of the transistor MOS3 receives the 5 volts standby voltage signal 5VSB1, a gate terminal of the transistor MOS3 receives the PG signal PG1, and a source terminal of the transistor MOS3 is coupled to the ground; a drain terminal of the transistor MOS4 receives the 5 volts standby voltage signal 5VSB1, a gate terminal of the transistor MOS4 receives the PG signal PG1, and a source terminal of the transistor MOS4 is coupled to the ground. More specifically, when the PG signal PG1 indicates that the power supply 110 operates normally (e.g. the PG signal PH1 has the logic value '1'), the transistors T1 and MOS3 are activated (turned on) to make the 5 volts standby voltage signal 5VSB1 drive a green LED of the LED 510 via the transistor T1. Correspondingly, when the PG signal PG1 indicates that the power supply 110 operates abnormally (e.g. the PG signal PG1 has the logic value'0'), the 5 volts standby voltage signal 5VSB1 drives a red LED of the LED 510. In this way, the user can determine if the power supply 110 operates normally based on the color of the LED circuit 260. In addition, when the PS-on signal PSon-1 indicates that the power supply 110 operates in a standby state, i.e. the PS-on signal PSon-1 has the logic value '1', the 5 volts standby voltage signal 5VSB-1 does not drive any LED of the LED circuit 510. It should be noted that, in the embodiment shown in FIG. 5, the circuits relatively irrelevant to the present invention are not depicted: for example, the resistors and impedances. Those skilled in the art should readily understand the functions and the connections of those circuits. The detailed description is therefore omitted here.

Figure 6:
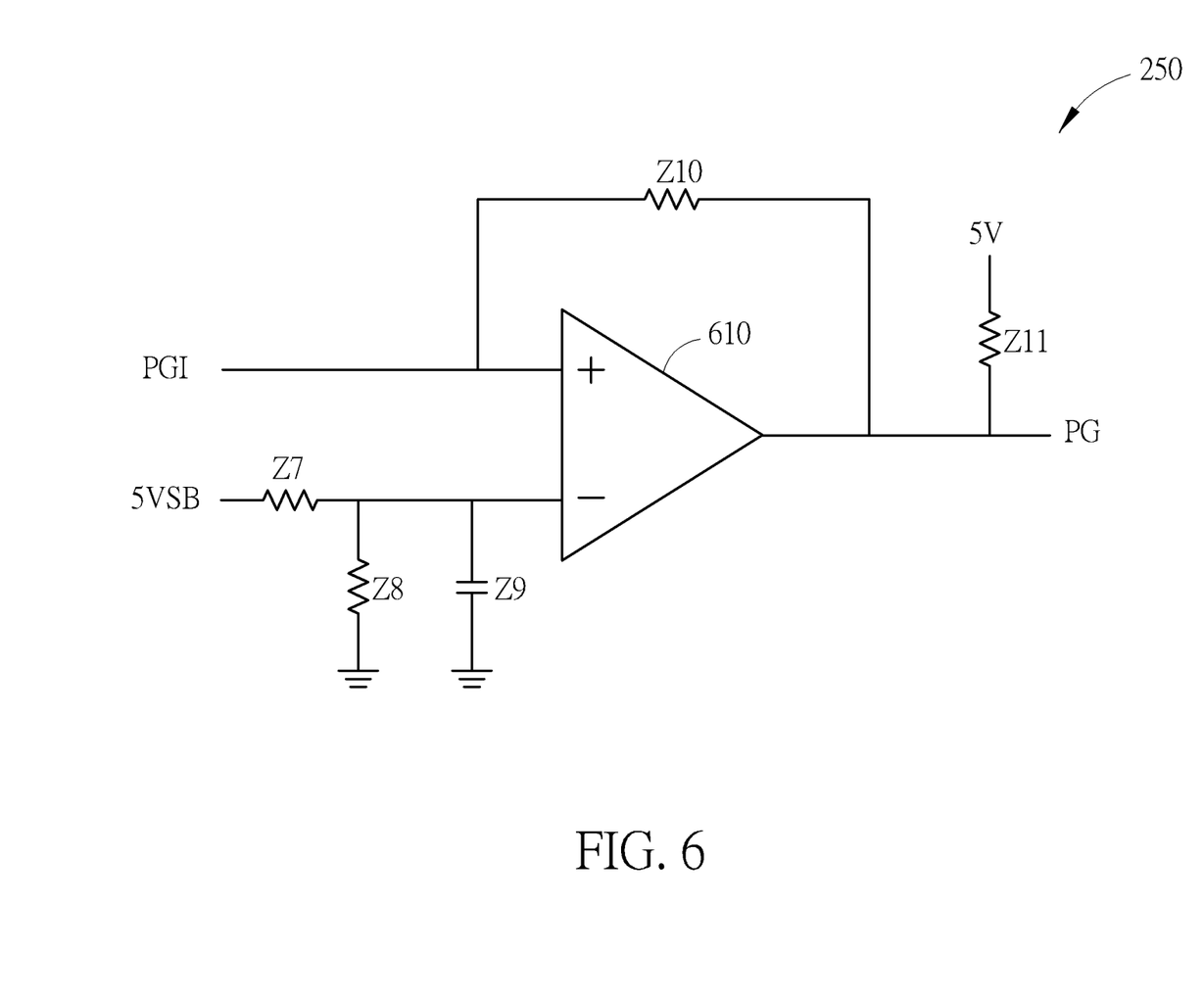
FIG. 6 is a diagram illustrating a processing circuit of the voltage output circuit shown in FIG. 2.

FIG. 6 is a diagram illustrating the processing circuit 250 of the voltage output circuit 130 shown in FIG. 2. As shown in FIG. 6, the processing circuit 250 comprises a comparing circuit 610 and impedances Z7-Z11, wherein the comparing circuit 610 is coupled to the transferring circuit 230, and the positive input terminal and the negative input terminal of the comparing circuit 610 are coupled to the PG input signal PGI and the output 5 volts standby voltage signal 5VSB, respectively. The comparing circuit 610 executes a signal processing circuit to compare the PG input signal PGI and the signal generated by dividing the output 5 volts standby voltage signal 5VSB with the impedances Z7 and Z8, and generates the inform signal PG on the output terminal of the comparing circuit 610. More specifically, when the PG input signal PGI is identical to or located in a predetermined range which deviates from the signal generated by dividing the output 5 volts standby voltage signal 5VSB, the inform signal PG equals the 5 volts voltage signal and is transmitted to the backend circuit to inform the backend circuits of the normal state of the PG input signal PGI. It should be noted that, in the embodiment shown in FIG. 4, circuits relatively irrelevant to the present invention are not depicted: for example, resistors and impedances; however, those skilled in the art should readily understand the functions and the connections of those circuits. The detailed description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power supply system, comprising:
   a plurality of power supplies from different sources, comprising at least a first power supply and a second power supply, wherein the first power supply is arranged to supply a first set of signals, and the second power supply is arranged to supply a second set of signals; and
   a voltage output circuit, coupled to the plurality of power supplies, wherein the voltage output circuit comprises a first input terminal, a second input terminal and a first output terminal, and the first input terminal receives a first voltage signal of the first set of signals and the second input terminal receives a second voltage signal of the second set of signals, comprising:
   a switching circuit, coupled to the first input terminal, the second input terminal, and the first output terminal;
   a transferring circuit, arranged to receive a standby voltage signal, a power supply-on (PS-on) signal, and a power good (PG) signal of the first set of signals, and a standby voltage signal, a PS-on signal, and a PG signal of the second set of signals; and
   a control circuit, arranged to determine whether to activate a first transistor or a second transistor of the switching circuit according to a voltage difference between the first input terminal and the second input terminal to make the voltage output circuit generate a first output voltage signal on the first output terminal according to the first voltage signal or the second voltage signal;
   wherein when the voltage output circuit generates the first output voltage signal according to the first voltage signal, the transferring circuit generates an output standby voltage signal according to the standby voltage signal of the first set of signals, an output PS-on signal according to the PS-on signal of the first set of signals, and a power good input (PGI) signal according to the PG signal of the first set of signals;
   wherein when the voltage output circuit generates the first output voltage signal according to the second voltage signal, the transferring circuit generates the output standby voltage signal according to the standby voltage signal of the second set of signals, the output PS-on signal according to the PS-on signal of the second set of signals, and the PGI signal according to the PG signal of the second set of signals.

2. The power supply system of claim 1, wherein the voltage output circuit further comprises:
   a processing circuit, coupled to the transferring circuit, wherein the processing circuit executes a signal processing operation upon the PGI signal and generates an inform signal, wherein the inform signal indicates whether the PGI signal is normal.

3. The power supply system of claim 2, wherein the signal processing operation comprises:
   comparing the PGI signal and the output standby signal; and
   generating the inform signal to indicate the PGI signal is normal when a difference between the output standby signal and the PGI signal locates within a predetermined range.

4. The power supply system of claim 1, wherein the transferring circuit comprises a plurality of diodes coupled to the standby voltage signal, the PS-on signal and the PG signal of the first set of signals, and the standby voltage signal, the PS-on signal and the PG signal of the second set of signals.

5. The power supply system of claim 1, wherein the voltage output circuit further comprises:
   a Light Emitting Diode (LED) circuit, coupled to the plurality of power supplies, wherein the LED circuit receives the standby voltage signal and the power good (PG) signal of the first set of signals, wherein when the PG signal indicates that the first power supply operates abnormally, the standby voltage signal drives an LED of the LED circuit; when the PG signal indicates that the first power supply operates normally, the standby voltage signal drives another LED of the LED circuit.

6. The power supply system of claim 5, wherein when the Power Supply-on (PS-on) signal of the first set of signals indicates that the first power supply operates in a standby state, the standby voltage signal does not drive any LED of the LED circuit.

7. The power supply system of claim 1, wherein the voltage output circuit further comprises:
   a second output terminal; and
   a Direct-Current (DC)-to-DC converting circuit, arranged to receive the first output voltage signal, and execute a converting operation upon the first output voltage signal to generate a second output voltage signal on the second output terminal;
   wherein the second output voltage signal is generated along with the first output voltage signal.

8. The power supply system of claim 7, wherein the voltage output circuit further comprises:
   a protecting circuit, arranged to receive the first output voltage signal and the second output voltage signal, and detect voltage values of the first output voltage signal and the second output voltage signal, when the voltage value of the first output voltage signal is greater than a first predetermined voltage or the voltage value of the second output voltage signal is greater than a second predetermined voltage, the protecting circuit transmits a protecting signal to the voltage output circuit to deactivate the voltage output circuit.

9. The power supply system of claim 1, wherein the first power supply and the voltage output circuit are installed within an electronic device and the second power supply is installed outside the electronic device.

10. A voltage output system, comprising:
    a circuit board;
    a plurality of input cables, installed on the circuit board;
    an output cable, installed on the circuit board; and
    a voltage output circuit, installed on the circuit board, wherein the voltage output circuit comprises a first input terminal, second input terminal, and a first output terminal, the first input terminal couples to one of the plurality of input cables to receive a first voltage signal of a first set of signals provided by a first power supply, and the second input terminal couples to another input cable to receive a second voltage signal of a second set of signals provided by a second power supply, the first power supply and the second power supply being from different sources, and the voltage output circuit further comprises a transferring circuit, arranged to receive a standby voltage signal, a power supply-on (PS-on) signal, and a power good (PG) signal of the first set of signals, and a standby voltage signal, a PS-on signal, and a PG signal of the second set of signals;

wherein the voltage output circuit selects the first voltage signal or the second voltage signal to generate the first output voltage signal according to a voltage difference between the first input terminal and the second input terminal, and when the voltage output circuit generates the first output voltage signal according to the first voltage signal, the transferring circuit generates an output standby voltage signal according to the standby voltage signal of the first set of signals, an output PS-on signal according to the PS-on signal of the first set of signals, and a power good input (PGI) signal according to the PG signal of the first set of signals;

wherein when the voltage output circuit generates the first output voltage signal according to the second voltage signal, the transferring circuit generates the output standby voltage signal according to the standby voltage signal of the second set of signals, the output PS-on signal according to the PS-on signal of the second set of signals, and the PGI signal according to the PG signal of the second set of signals.

11. The voltage output system of claim 10, wherein the voltage output circuit further comprises:
  a switching circuit, coupled to the first input terminal, the second input terminal and the first output terminal; and
  a control circuit, arranged to activate a first transistor or a second transistor of the switching circuit according to the voltage difference between the first input terminal and the second input terminal to make the voltage output circuit generate a first output voltage signal on the first output terminal according to the first voltage signal or the second voltage signal.

12. The voltage output system of claim 10, wherein the voltage output circuit further comprises:
  a second output terminal, coupled to the output cable; and
  a Direct-Current (DC)-to-DC converting circuit, arranged to receive the first output voltage signal, and execute a converting operation upon the first output voltage signal to generate a second output voltage signal on the second output terminal.

13. The voltage output system of claim 10, wherein the first power supply and the voltage output circuit are installed within an electronic device and the second power supply is installed outside the electronic device.

* * * * *